United States Patent [19]
Okude et al.

[11] Patent Number: 6,026,200
[45] Date of Patent: *Feb. 15, 2000

[54] MOTION IMAGE COMMUNICATING SYSTEM AND IMAGE RESTORING METHOD AND APPARATUS THEREFOR

[75] Inventors: Mariko Okude, Hitachi; Norifumi Yanai, Kokubunji; Kouzou Nakamura, Hitachioota, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/941,318

[22] Filed: Sep. 30, 1997

Related U.S. Application Data

[63] Continuation of application No. 08/415,935, Apr. 3, 1995, abandoned.

[30] Foreign Application Priority Data

Apr. 11, 1994 [JP] Japan .................................. 6-071854

[51] Int. Cl.[7] ...................................................... G06K 9/03
[52] U.S. Cl. ...................... 382/311; 348/407; 348/845.1; 371/35; 382/236; 382/282
[58] Field of Search .................... 382/239, 309, 382/311, 232, 243, 282, 250; 358/261.2, 430, 433; 348/404, 407, 420, 845.1; 371/19, 37.3, 40.2, 41, 35

[56] References Cited

U.S. PATENT DOCUMENTS

| | | | |
|---|---|---|---|
| 3,893,072 | 7/1975 | D'Antonio et al. | 371/35 |
| 4,051,510 | 9/1977 | Cochran | 358/28 |
| 4,152,068 | 5/1979 | Bickl et al. | 355/38 |
| 4,651,206 | 3/1987 | Ohki | 348/416 |
| 4,654,484 | 3/1987 | Reiffel et al. | 379/53 |
| 4,701,923 | 10/1987 | Fukasawa et al. | 371/41 |
| 4,718,066 | 1/1988 | Rogard | 371/35 |
| 4,870,497 | 9/1989 | Chamzas et al. | 358/426 |
| 4,979,174 | 12/1990 | Cheng et al. | 371/41 |
| 5,027,400 | 6/1991 | Baji et al. | 380/20 |
| 5,128,776 | 7/1992 | Scorse et al. | 358/453 |
| 5,138,447 | 8/1992 | Shen et al. | 348/384 |
| 5,150,432 | 9/1992 | Ueno et al. | 382/250 |
| 5,228,028 | 7/1993 | Cucchi et al. | 348/402 |
| 5,247,591 | 9/1993 | Baran | 382/61 |
| 5,260,783 | 11/1993 | Dixit | 348/409 |
| 5,293,250 | 3/1994 | Okumura et al. | 358/402 |
| 5,327,247 | 7/1994 | Osborne et al. | 348/100 |
| 5,386,297 | 1/1995 | Tanaka et al. | 358/402 |

(List continued on next page.)

FOREIGN PATENT DOCUMENTS

| | | | |
|---|---|---|---|
| 4-258056 | 9/1992 | Japan | H04L 12/54 |
| 4-263545 | 9/1992 | Japan | H04L 29/02 |
| 5227517 | 9/1993 | Japan | H04N 7/133 |

OTHER PUBLICATIONS

Neil MacDonald, "Transmission of Compressed Video Over Radio Links", *Visual Communication and Image Processing '92*, SPIE vol. 1818, pp. 1484–1487.

Ziemer et al., Introduction to Digital Communication, 1992, p470–493, Macmillan, TK5103.7.Z55.

"Image Reconstruction with Clustering" by Kiichi Urahama, et al, Dept. of Computer Science and Electronics, Kyusbu Institute of Technology—An English Abstract is attached.

*Primary Examiner*—Amelia Au
*Assistant Examiner*—Timothy M. Johnson
*Attorney, Agent, or Firm*—Antonelli, Terry, Stout & Kraus, LLP

[57] ABSTRACT

An image restoring apparatus is provided that can restore an image disturbed by transmission error to a natural image in real time even if the transmission error occurs frequently. The image restoring apparatus has refresh control means for updating all the image data of a frame, inframe correcting means for effecting correction processing in the frame, and selecting means for selecting either of the refresh control means or the in-frame correcting means by detecting of number or positions of blocks having an error in the pixel data of the frame.

32 Claims, 6 Drawing Sheets

U.S. PATENT DOCUMENTS

| | | | |
|---|---|---|---|
| 5,410,553 | 4/1995 | Choon | 382/309 |
| 5,426,513 | 6/1995 | Scorse et al. | 358/433 |
| 5,432,871 | 7/1995 | Novik | 382/232 |
| 5,453,997 | 9/1995 | Roney, IV | 371/41 |
| 5,510,844 | 4/1996 | Cash et al. | 348/465 |
| 5,528,284 | 6/1996 | Iwami et al. | 348/19 |
| 5,557,320 | 9/1996 | Krebs | 348/12 |
| 5,574,934 | 11/1996 | Mirashrafi et al. | 395/800 |

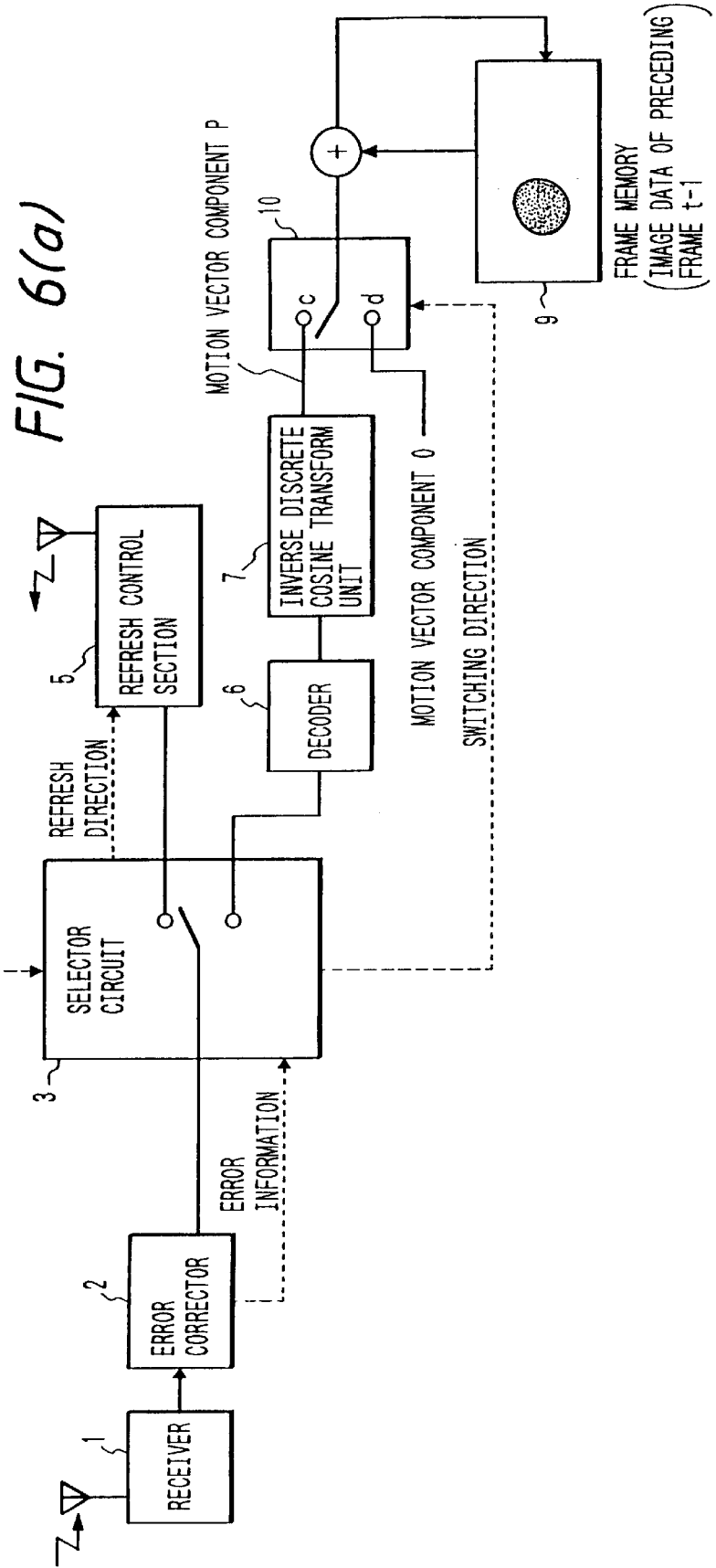

MOTION IMAGE COMMUNICATING SYSTEM AND IMAGE RESTORING METHOD AND APPARATUS THEREFOR

This application is a continuation of application Ser. No. 08/415,935 filed on Apr. 3, 1995, now abandoned.

BACKGROUND OF THE INVENTION

The present invention relates to a moving image communicating system and an image restoring method an apparatus. More particularly, it concerns a motion image communicating system and an image restoring apparatus having a correcting arrangement for correcting an image disturbed by a transmission error.

Previous communication systems for transmitting compressed image data generally use an error correction code to prevent transmission error from disturbing an image. If the code cannot correct the disturbed image, a restoring method usually corrects the data.

The correction process on the restoring side is carried out by looking at pixel data of a preceding frame before replacing error data by calculated correction values. Such a method is limited to processes of fast motion images and the switching of scenes. For this reason, the Japanese Patent Application Laid-Open No. 5-227517 disclosed a method employing in-frame and between-frame correction processes before and after an expansion of compressed image data to control one of the processes depending on the degree of the error.

However, the proposed method performs the correction process in units of a block which is not effective for a radio transmission involving a random error, due to decrease of the signal-to-noise ratio and long burst error due to fading.

On the other hand, a communication apparatus for radio transmitting of image data makes use of an error correction code and interleave and resend processes to overcome random error and fading. For example, MacDonald, N., proposed a system having an error correction feature intensified with use of the three methods mentioned above in an article entitled "Transmission of Compressed Video Over Radio Link: Visual Communication and Image Processing '92." However, this system has the disadvantage that a communication apparatus on a send end involves a process delay when it has to process motion image data at any time, since it stops an encoding process temporarily while it is executing a resend process.

As described above, prior arts methods involve the problem that the motion image transmission system for transmitting continuous image signal over plurality of frames produces an in-frame and a between-frame, but cannot always be effective in the correction process for a radio link that is likely to have a burst error. The system also does not take into account the delayed process in executing a resending of the blocks whenever an error occurs.

SUMMARY OF THE INVENTION

For purpose of solving the foregoing problems, it is an object of the present invention to provide a motion image restoring apparatus that can restore an image disturbed by transmission error to a natural image in real time even if the transmission error occurs frequently.

Briefly, the foregoing object is accomplished in accordance with aspects of the present invention by an image restoring apparatus of an image communicating system for receiving an image signal continuously over a plurality of frames, the system having a correcting arrangement for correcting an image disturbed by transmission error wherein: the correcting arrangement has refresh control means for updating all the image data of a screen, in-frame correcting means for performing correction process on the screen data, and selecting means for selecting either the refresh control means or the in-frame correcting means by detecting a number of errors or positions of blocks having an error in the pixel data of the screen.

The motion image restoring apparatus constructed as described above can adaptively control switching between in-frame correcting means and refresh control means depending on the transmission error occurrence situation even if the transmission error occurs frequently. That is, the motion image restoring apparatus can execute an in-frame correcting if the detected error occurrence detection is higher than a predetermined value or refresh control if the detected error occurrence is lower than the predetermined value. The image reception cannot be interrupted for a long time, since the refresh process is repeated even if an error occurs at a high frequency, while the received image data is corrected in the in-frame correction process if error occurs at a relatively low frequency. Also, the image can be naturally restored, since the correction process is executed on the screen in an effective range. This means that the image disturbed due to transmission error can be restored to a natural image in real time even if the transmission error occurs frequently.

BRIEF DESCRIPTION OF THE DRAWINGS

In the accompanying drawings:

FIG. 6(a) is a block diagram illustrating an image communication apparatus for judging whether or not all the frames are updated by detecting whether or not a significant area contains an error occurrence or error block position in the screen data; and FIG. 6(b) is a diagram illustrating an image shown on a display screen.

PREFERRED EMBODIMENTS

Figure 1:
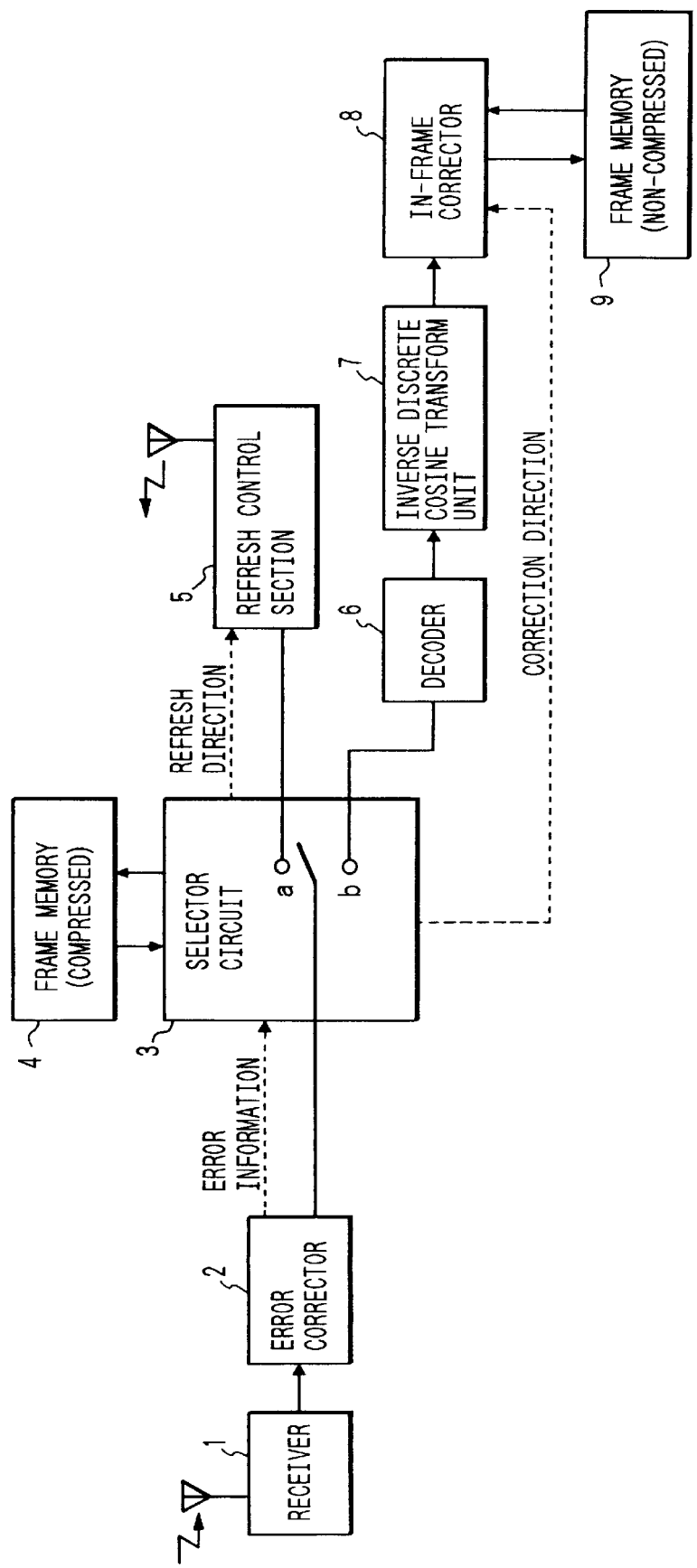
FIG. 1 is a block diagram illustrating a receiving end of the communication system.

The following describes in detail embodiments of the present invention by reference to the accompanying drawings. FIG. 1 depicts a block diagram illustrating a receiving end of the communication system.

In the figure, signals output by a receiver 1 are applied to a selecting circuit 3 (selecting means) through an error corrector 2. One of the signals selected by the selector circuit 3 is supplied to a refresh control section 5 (refresh control means). The other output is applied through a decoder 6 and inverse discrete cosine transformer 7 to an in-frame image corrector 8 (in-frame correcting means). The selector circuit 3 is connected to a frame memory 4. The frame corrector 8 is connected to a frame memory 9.

In the circuit construction described above, image data received by the receiver 1 is fed to the error corrector 2. The error corrector 2 detects and corrects error codes. If the error corrector 2 detects an error code, but cannot correct it, the error corrector 2 informs the selector circuit 3 of the error.

The selector circuit 3 monitors error occurrence situation on the basis of the error information fed from the error corrector 2. As a result, it selects either option a or option b. The frame memory 4 accumulates the codes which have been error corrected, as well as codes which have not been corrected, by the error corrector 2.

If the selector circuit 3 selects option a to start the refresh control section 5 as a result of the monitoring of the error occurrence situation, the refresh control section 5 appends to the send end of the image data a refresh request signal, that is a signal for that all of the pixel data of the screen be sent. The image data transmitted by the image communication system of the present invention usually consists of motion vector values the time redundancy removed from the image to increase the transmission efficiency.

If a refresh request signal is received, the calculation process of the motion vector process is interrupted before all the pixel data of the frame is transmitted. If all the pixel data of the frame is transmitted, all the pixels are restored in the pixel data.

On the other hand, if the selector circuit 3 selects option b to start the in-frame image corrector 8 as a result of the monitoring of the error occurrence situation, first the decoder 6 calculates a discrete cosine conversion coefficient. Then the inverse discrete cosine transformer 7 restores the pixel data from the discrete cosine transformation coefficient calculated by the decoder 6 by way of discrete cosine transformation.

Finally, the in-frame image corrector 8 corrects all the data of the block having a correction direction given from the selector circuit 3 by looking at adjacent pixels before employing a clustering algorithm for image segmentation. The screen memory 9 is used as a working memory to store the pixel data of the screen for the correction process on the frame of data.

The first embodiment described above has the selector circuit 3 give the correction direction to the in-frame image corrector 8. Instead, the error corrector 2 may be used to supply the direction information.

Figure 2:
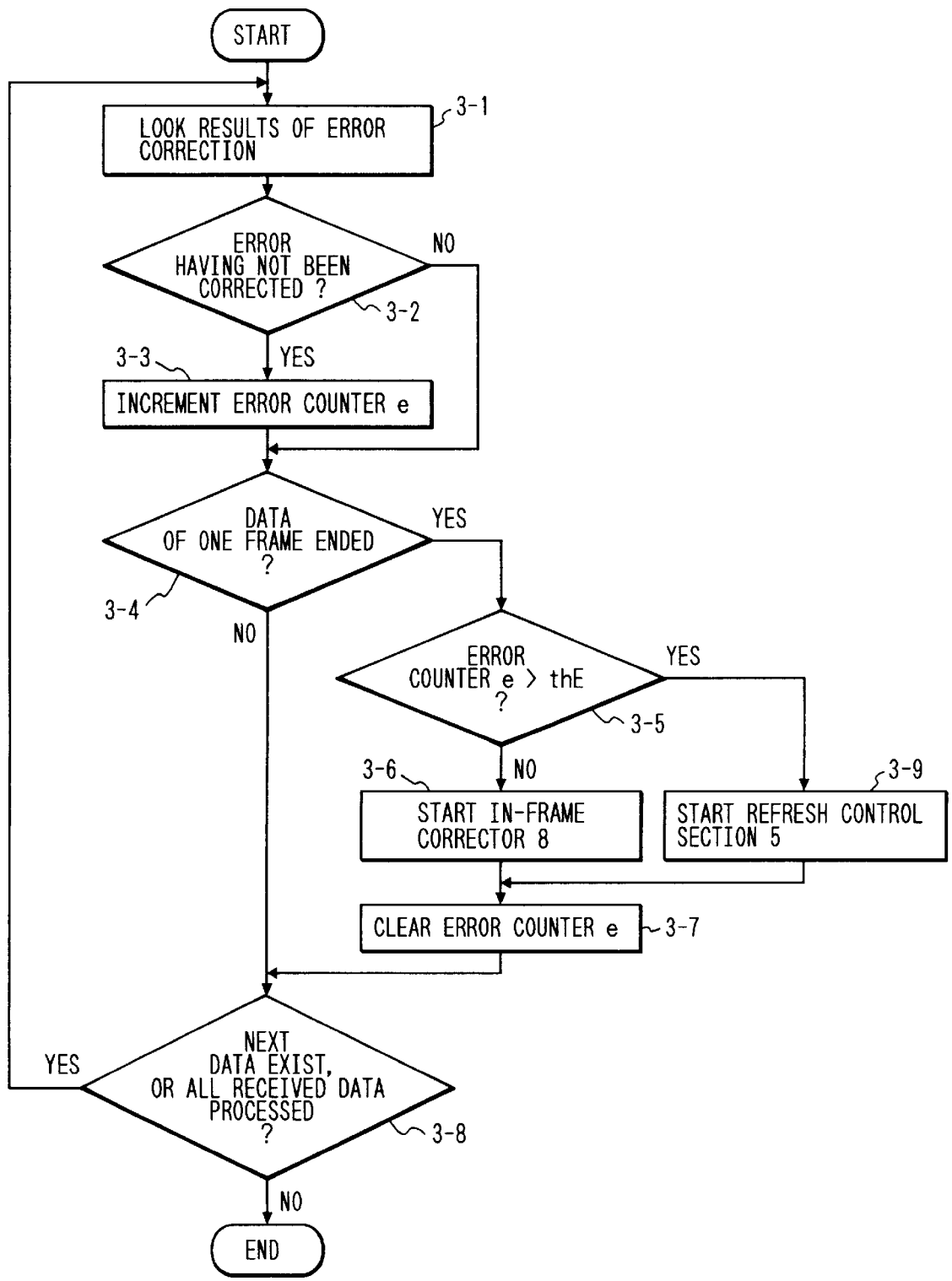
FIG. 2 is a flow chart illustrating procedures for monitoring the error occurrence situation in the selector circuit 3.

FIG. 2 depicts a flow chart illustrating procedures for monitoring the error occurrence situation in the selector circuit 3. Step 3-1 has the selector circuit 3 look at a result of the error correction information fed out of the error corrector 2. Step 3-2 decides whether the error could be corrected or not, or confirms whether the error corrector 2 did send error information or not thereto. If the error is the one that step 3-2 indicates could not be corrected, step 3-3 increments an error counter e.

In turn, step 3-4 judges whether the processes steps 3-1 to 3-2 for the pixel data of one frame were completed or not. If so, step 3-5 judges whether or not the error counter e exceeded an error threshold value the set in advance. This judgement identifies whether the damage caused to the whole screen by the transmission error is at a degree at which the in-frame correction can restore the damage or whether the frame is to be refreshed.

If step 3-5 judges that the error counter e did not exceed the error threshold value the, step 3-6 starts the in-frame image corrector 8. In such case, step 3-9 starts the frame memory 9. To start monitoring the error occurrence situation of the next frame, step 3-7 clears the error counter e. The procedures from steps 3-1 to 3-9 are repeated until step 3-8 judges that the processing of all the data is complete.

Figure 3:
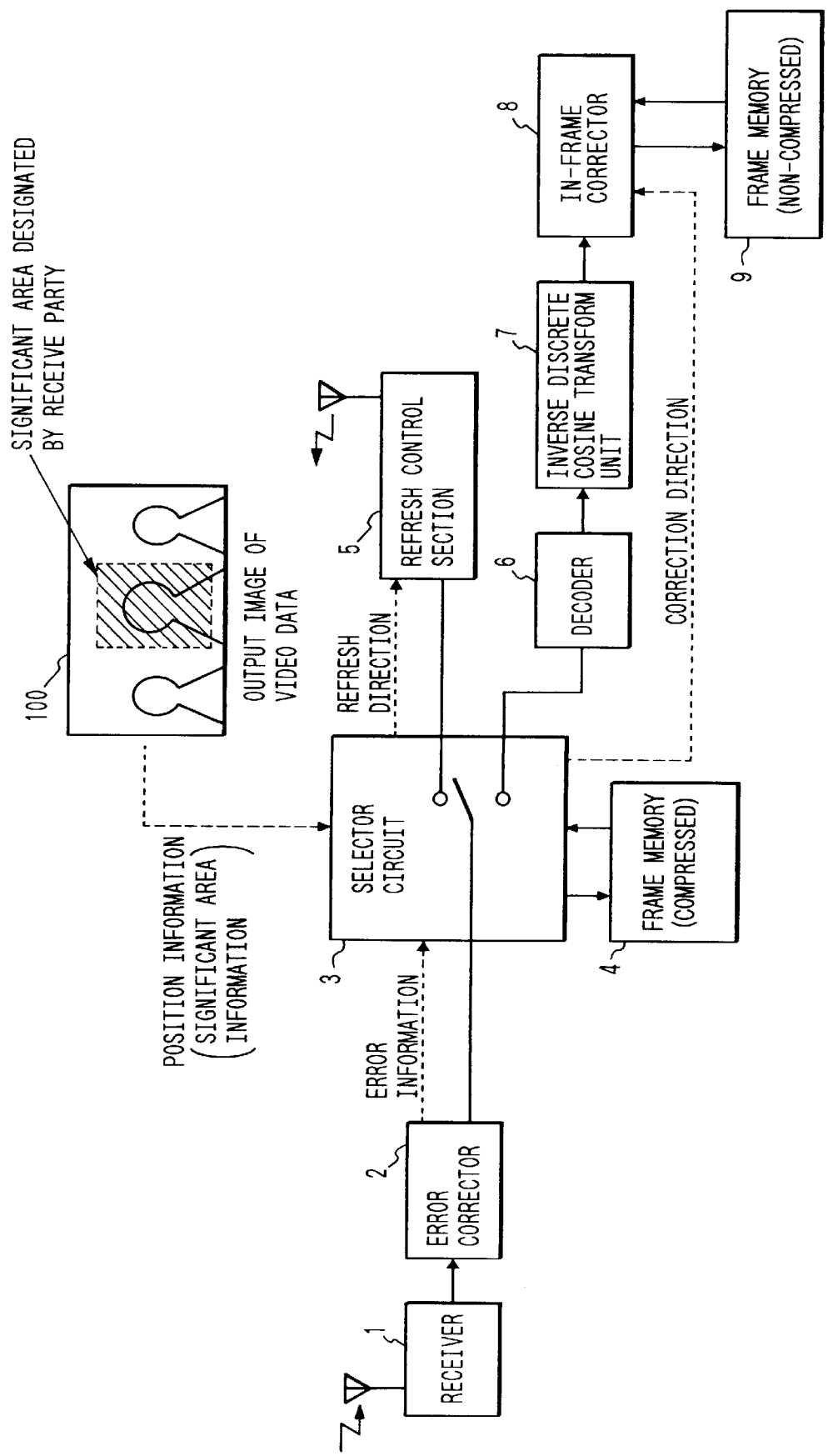
FIG. 3 is a block diagram illustrating a receiving end of the communication system incorporating important area deciding procedures for the selector circuit 3.

FIG. 3 is a block diagram illustrating a system of performing important area deciding procedures by the selector circuit 3. The selector circuit 3 selects the refresh control section 5 or the in-frame image corrector 8 to start operations by judging whether or not the position of a block of pixel data having an error is within a significant area of the frame of screen data.

An output 100 of the image data represents an image of the picture shown on the image communication apparatus. A user on the receive end should indicate the significant area (shaded area) of the display using input means, such as touch panel display, pen, or mouse, while observing the display. The position information of the frame then is sent to the selector circuit 3. The selector circuit 3 judges whether or not the error corrector 2 has not corrected block positions which correspond to the position information the user has indicated. If so, the selector circuit 3 starts the refresh control section 5. If not, the selector circuit 3 starts the in-frame image corrector 8.

The embodiment described above has the user on the receive end indicate the significant area of data in a frame. Alternatively, the user on the send end may identify the significant area by adding the information indicating the significant area to the image data to be sent. Also, the embodiment described above has the significant area indicated by coordinates while the user is observing the image on the display. The embodiment may have a video, sound, or similar features added thereto. The feature can indicate the significant area by executing a recognition process according to inputs, for example, "person having a red cloth" and "building in background."

Further, the significant area information indicated by the user on the receive end can be added to the refresh request signal to add the send feature to the send end. The send feature allows the image communication apparatus on the send end to recognize the image area that the receive user wishes to see before sending only the pixel data of that area.

Figure 4:
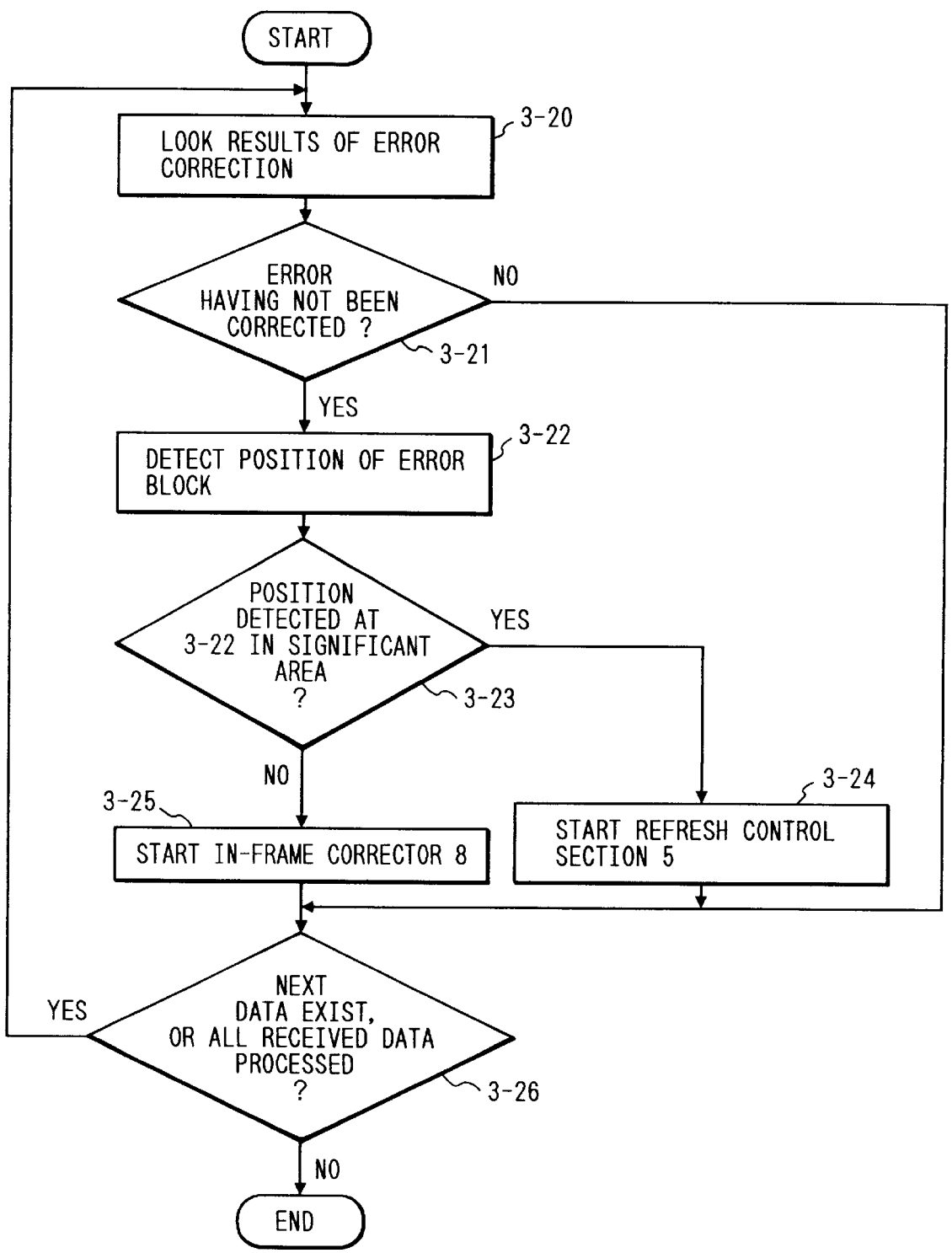
FIG. 4 is a flow chart illustrating the procedures as the selector circuit 3 executes an important area decision.

FIG. 4 depicts a flow chart illustrating the embodiment in which the selector circuit 3 executes a significant area decision. Step 3-20 has the selector circuit 3 look at a result of the error correction information fed out of the error corrector 2. Step 3-21 decides whether the error could be corrected or not, or confirms whether the error corrector 2 did send error information or not thereto. If the error is the one that step 3-21 indicates could not be corrected, step 3-22 detects a position of the error block in the frame. Step 3-23 decides whether or not the significant area contains the position detected at step 3-22. If so, step 3-24 starts the refresh control section 5. If not, step 3-25 starts the in-frame image corrector 8. The procedures from steps 3-20 to 3-26 are repeated until step 3-26 judges that processing of all the data has been completed.

Figure 5:
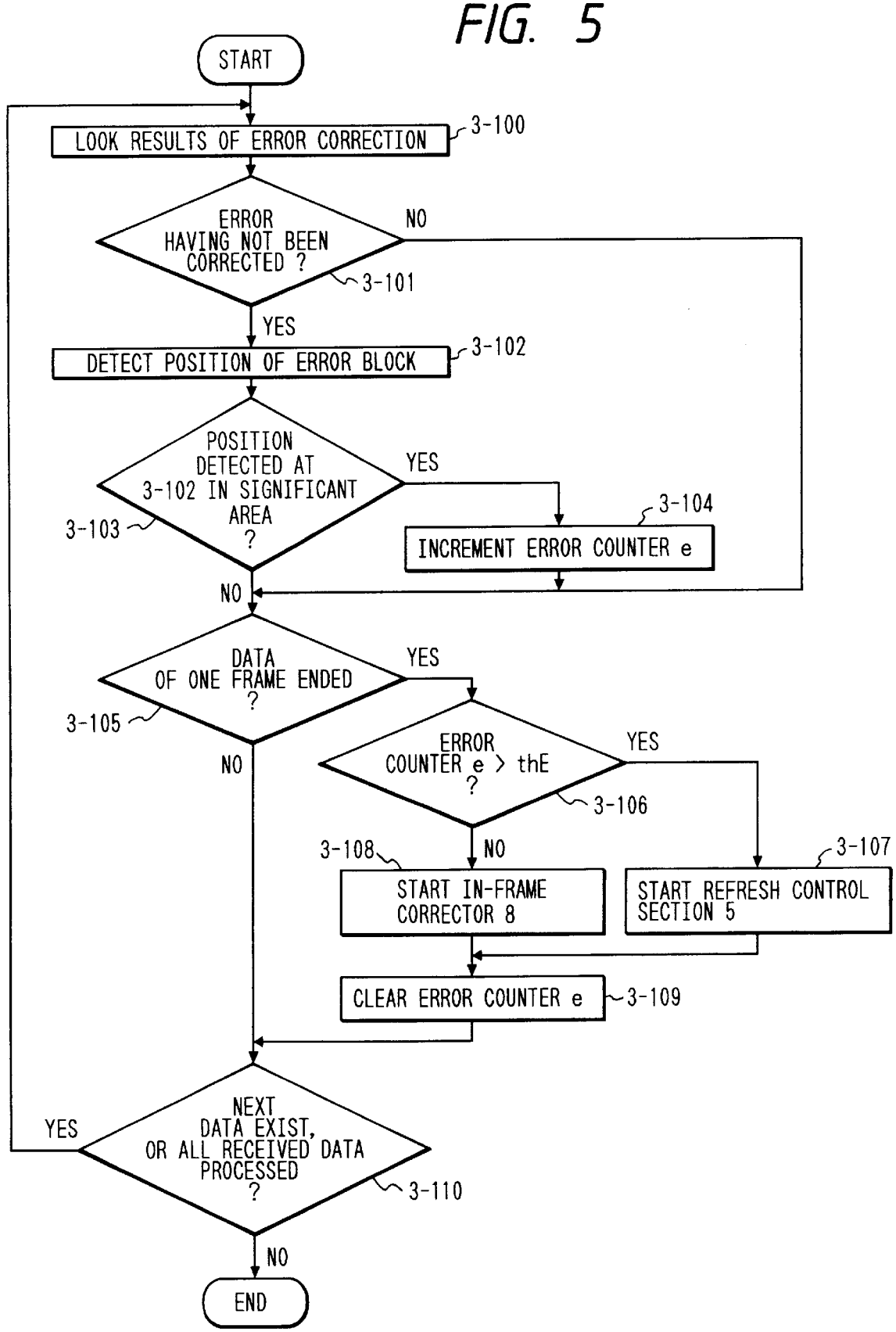
FIG. 5 is a block diagram illustrating a receiving end of the communication system wherein the selector circuit 3 monitors the error occurrence situation and executes the process of significant area decision.

FIG. 5 depicts a block diagram illustrating an embodiment in which the selector circuit 3 monitors the error occurrence situation and executes the process of significant area decision. The selector circuit 3 selects the refresh control section 5 or the in-frame image corrector 8 to start operations by monitoring the error occurrence situation in the significant area indicated by the user. Steps 3-100 to 3-103 are the same as steps 3-20 to 3-23 described with reference to FIG. 4 above. If the block position judged at step 3-103 is found to have an error, step 3-104 increments error counter e.

If step 3-105 finds that the processing of pixel data of one frame is completed, step 3-106 judges whether the error counter e did exceed an error threshold value the set in advance. If so, step 3-107 starts the refresh control section 5. If not, step 3-108 starts the in-frame image corrector 8. To start monitoring the error occurrence situation of the next frame, step 3-109 clears the error counter e. The procedures from steps 3-100 to 3-110 are repeated until step 3-109 judges that the processing of all the data has been completed.

FIG. 6(*a*) depicts a block diagram illustrating an embodiment of an image communication apparatus for judging whether or not all the frames are updated by detecting whether or not the significant area contains an error or an error block position is present in the frame. The selector circuit 3 starts the refresh control section 5 or switching means 10 on the basis of a result of the error occurrence monitoring after the error information is supplied from the error corrector 2 or the significant area information has been indicated by the user.

In the following, the transmission image data will be described before explaining the switching means 10. An output image 200 in FIG 6(*b*) represents an image shown on the display of the image communication apparatus. Let x denote an axis of abscissa of the frame, y be an axis of the ordinates, t be time. Also let p(xt, yt) denote pixel values at coordinates xt and yt of a position at time t. The output image 200 has the pixel p(xt, yt) shown on the same frame at time t together with the pixel p(xt−1, yt−1) of the preceding frame at time t−1 for simplicity of description. In fact, a subject at position A moves to position A' along vector P (dotted arrow in the figure) after one frame (in time t). The initial transmission sends all the pixel data of the frame. After that, only the motion vector of the subject on the frame is sent as shown by vector P.

The selector circuit 3 supplies a switching direction information to the switching means 10 on the basis of a result of monitoring the error occurrence and significant area decision. The switching means 10 selects option c or d, usually c, depending on the switching direction information received from the selector circuit 3. The inverse discrete cosine transformer 7 adds the motion vector components decoded by the decoder 6 to the preceding frame data stored in the frame memory 9 to update the image. If an error occurs in the vector P indicated in the output image 200 of the frame, the switching means 10 selects option d thereby forcibly replacing the motion vector component by 0 to add it to the preceding frame data.

In that case, the image data of the preceding frame is not updated. The user on the receive end therefore does not see the image damaged by the transmission error. The image is subjected to relatively little influence by the transmission error until the transmission situation is recovered.

The embodiment described above has the selector circuit 3 supply the switching information to the switching means 10. Instead, the error corrector 2 may supply the switching direction information. In that case, the results output by the selector circuit 3 for monitoring the error occurrence situation and for executing the other process are not directly reflected to in the image. The switching means 10 therefore needs to be controlled only at the time when an error cannot be corrected by the error corrector 2.

As described so far, the present invention has the advantage that the image reception cannot be interrupted for a long time since the refresh process is repeated even if an error occurs at a high frequency, while the received image data is corrected in the inframe correction process if an error occurs at a relatively low frequency. Also, the present invention has the advantage that the image can be naturally restored since the correction process is executed on a frame basis in an effective range. This means that the image disturbed due to transmission error can be restored to a natural image in real time even if the transmission error occurs frequently.

What is claimed is:

1. A motion image restoring method in an image communicating system for transmitting an image signal continuously over a plurality of frames from a transmitting station and restoring a distorted image in a receiving station by means of an error correction process for correcting errors in the image distorted by transmission error, comprising the steps of:

while image data representing an image distorted by a transmission error is being processed in the receiving station, monitoring an occurrence rate of a bit error in the image data detected by an error correction process in the receiving station; and upon completion of receipt of one frame, using a selection means to receive the image data and selectively connect the image data to one of two separate outputs, either an output connected to an in-frame correction processing which corrects a pixel in said image data with reference to other pixels in the vicinity of said pixel, if the occurrence of a bit error is lower than a predetermined rate or an output connected to a refresh request signal transmission processing if the occurrence of a bit error is not lower than the predetermined rate.

2. A motion image restoring method in an image communicating system for transmitting an image signal continuously over a plurality of frames from a transmitting station and correcting in a receiving station an image distorted by a transmission error by means of an error correction process, comprising the steps of:

while an image distorted by a transmission error is being processed in the receiving station, monitoring an occurrence rate of a bit error in the image data detected by the error correction process in the receiving station; and upon completion of receipt of one frame, if the occurrence of a bit error is not lower than a predetermined rate, using a selection means to receive the image data and selectively connect the image data to an output connected to a refresh process, instead of an output connected to an in-frame correction process employing a clustering reconstruction algorithm, by sending a request to the transmitting station instructing the transmitting station to interrupt processing of the current frame data and to transmit refresh data in-frame to the receiving station.

3. A motion image restoring method in an image communicating system for transmitting an image signal continuously over a plurality of frames from a transmitting station and correcting in a receiving station an image distorted by a transmission error by means of an error correction process, comprising the steps of:

while image data representing an image distorted by a transmission error is being processed in the receiving station, determining in said receiving station whether each block in a data frame having an error is in a significant area of the data frame or not, and counting the number of error blocks in said significant area;

if the number of error blocks in the significant area is greater than a predetermined value, subjecting the error blocks to a refresh process by sending a request to the transmitting station instructing the transmitting station to transmit refresh data in-frame to the receiving station; and if the number of error blocks in the significant area is smaller than the predetermined value, subjecting the error blocks to an in-frame correction process which corrects a pixel in the error blocks with reference to pixels in peripheral blocks surrounding the error blocks, wherein said steps of determining and counting are performed upon completion of receipt of one data frame, and before executing the refresh request signal transmission processing of the error blocks or the in-frame correction processing in accordance with the number of error blocks and for providing a correction direction signal to the in-frame correcting means.

4. The motion image restoring method according to claim 3, wherein a relationship of the position of the block to the significant area is determined on the basis of significant area information added to image data sent by said transmitting station.

5. The motion image restoring method according to claim 3, wherein the significant area of the frame is an area indicated on the frame with input means used by an operator at an image communication terminal of the receiving station.

6. The motion image restoring method according to claim 3, wherein a determination of the significant area of the frame is made on the basis of an area indicated on the frame with a touch panel display, a pen, or a microphone used by the operator of an image communication terminal of the receiving station.

7. The motion image restoring method according to claim 3 wherein in the refresh process, image data having a refresh process request signal added thereto is sent to said transmitting station along with significant area information indicated by an operator of the receiving station.

8. An image restoring apparatus for use in a receiving station of an image communicating system for receiving an image signal transmitted continuously over a plurality of frames from a transmitting station, and having a correcting arrangement in the receiving station for correcting an image distorted by transmission error, wherein the correcting arrangement has:

refresh control means for transmitting an in-frame data refresh request signal to the transmitting station to interrupt processing of the current frame data and to update all image data of the current frame;

in-frame correcting means for performing an in-frame correction process on data in the frame;

detection means for detecting the number of error blocks and the position of error blocks having an error in the pixel data of the frame; and selecting means for selectively connecting the image data to one of two separate outputs, either an output connected to the refresh control means or an output connected to the in-frame correcting means on the basis of the number of error blocks and positions of error blocks having an error in the pixel data of the frame detected by said detection means.

9. The image restoring apparatus according to claim 8, wherein the selecting means operates in said recovery station to select the refresh control means if the detected number of error blocks having an error exceeds a threshold number or to select the in-frame correcting means if the detected number of error blocks having an error is not larger than the threshold number.

10. The image restoring apparatus according to claim 8, wherein the selecting means is responsive to whether or not the detected position of an error block having an error is located in a significant area on the frame for selecting the refresh control means if the detected position of the error block is in the significant area and for selecting the in-frame correcting means if the detected position of the error block is outside of the significant area, wherein said selecting means selects one of said refresh control means and said in-frame correcting means upon completion of receipt of one data frame and before executing the refresh request signal transmission processing when the position of the error block is judged to be in the significant region, or the in-frame correction processing when the position thereof is judged to be outside the significant region.

11. The image restoring apparatus according to claim 8, wherein the selecting means operates to perform a selection process on the basis of significant area information added to image data transmitted by said transmitting station, wherein said selecting means selectively connects one of the two separate outputs connected to said refresh control means and said in-frame correcting means upon completion of receipt of one data frame, and before executing the refresh request signal transmission processing when the position of the error block is judged to be in the significant region, or the in-frame correction processing when the position thereof is judged to be outside the significant region.

12. The image restoring apparatus according to claim 8, wherein:

the in-frame correcting means comprises switching means for switching a motion vector value to be added to a preceding frame in response to said number of errors or positions of error blocks having an error in the frame detected by said detecting means before deciding whether the preceding frame is to be updated or not, wherein:

(a) if the preceding frame is not to be updated, a motion vector component of 0 is added to data of the preceding frame; and (b) if the preceding frame is to be updated, a received motion vector component is added to data of the preceding frame.

13. An image restoring apparatus for use in a receiving station of an image communicating system for receiving an image signal transmitted continuously over a plurality of frames from a transmitting station, and having a correcting arrangement in the receiving station for correcting an image distorted by transmission error, wherein the correcting arrangement has:

refresh control means for transmitting an in-frame data refresh request signal to the transmitting station to interrupt processing of the current frame data and to update all image data of the current frame;

in-frame correcting means for performing an in-frame correction processing on data in the frame; and selecting means for selectively connecting the image data to one of two separate outputs, either an output connected to the refresh control means or an output connected to the in-frame correcting means, upon completion of receipt of one frame data and before any processing is performed in either one of said refresh control means or the in-frame correcting means.

14. An image restoring apparatus for use in a receiving station of an image communicating system for receiving an image signal transmitted continuously over a plurality of frames from a transmitting station, and having a correcting arrangement in the receiving station for correcting an image distorted by transmission error, wherein the correcting arrangement has:

refresh control means for transmitting an in-frame data refresh request signal to the transmitting station to update all image data of a frame;

in-frame correcting means for performing an in-frame correction process on pixel data in a specific area of the frame;

detecting means for detecting the number of error blocks and the positions of error blocks having an error in the pixel data of the frame; and selecting means for selectively connecting the image data to one of two separate outputs, either an output connected to the refresh control means or an output connected to the in-frame correcting means, on the basis of the number and position of error blocks detected by the detecting means.

15. The image restoring apparatus according to claim 8, 13, or 14 wherein the image restoring apparatus is used in an image communication apparatus for resending image data transmitted by wire or radio wave.

16. An image restoring apparatus for use in an image communicating system for transmitting from a transmitting station an image signal continuously over a plurality of frames to a receiving station, wherein the image restoring apparatus has:

refresh control means for transmitting an in-frame data refresh request signal to the transmitting station to update all image data of a frame;

in-frame correcting means for performing an in-frame correction process which corrects pixels in the image data in the frame with reference to other pixels in the vicinity of said pixel;

detection means for detecting the number of error blocks and the position of error blocks; and selecting means for selectively connecting the image data to one of two separate outputs, either an output connected to the refresh control means or an output connected to the in-frame correcting means, on the basis of number of error blocks and positions of error blocks having an error in the pixel data of the frame detected by said detection means.

17. The image restoring apparatus according to claim 16, wherein:

the in-frame correcting means comprises switching means for switching a motion vector value to be added to a preceding frame in response to said number of errors or positions of the error blocks having an error detected by said detecting means before deciding whether the preceding frame is to be updated or not and wherein:

(a) if the preceding frame is not to be updated, a motion vector component of 0 is added to data of the preceding frame; and (b) if the preceding frame is to be updated, a received motion vector component is added to data of the preceding frame.

18. An image restoring apparatus for use in an image communicating system for transmitting from a transmitting station an image signal continuously over a plurality of frames to a receiving station, wherein the image restoring apparatus has:

error processing means for detecting a transmission error code before correcting an error in image data;

refresh control means for transmitting an in-frame data refresh request signal to the transmitting station to update all image data of a frame;

in-frame correcting means for performing an in-frame correction process which corrects pixel data in a specific area of the frame with reference to other pixel data;

detecting means for detecting the number of errors and the positions of error blocks having an error in the pixel data of the frame; and selecting means for selectively connecting the image data to one of two separate outputs, either an output connected to the refresh control means or an output connected to the in-frame correcting means on the basis of the number and position of error blocks detected by the detecting means and for providing a correction direction signal to the in-frame correcting means;

the selecting means, after having completed receipt of one data frame, selects the output connected to the in-frame correcting means when the number of error blocks in the image data is less than a predetermined value and selects the output connected to the refresh control means when the number of error blocks is greater than said predetermined value.

19. A motion image restoring method in an image communicating system for transmitting an image signal continuously over a plurality of frames from a transmitting station and correcting in a receiving station an image distorted by a transmission error by means of an error correction process, comprising the steps of:

while transmitted image data representing an image distorted by a transmission error is being processed in the receiving station, counting the number of errors in the transmitted image data; and upon completion of receipt of each data frame, selecting between a refresh request signal transmission processing, in which a refresh process request instructs the transmitting station to interrupt processing of the current frame data and to transmit refresh data in-frame to the receiving station, and an in-frame correction processing, in which erroneous pixel data in the data frame is corrected by reference to other pixel data surrounding the erroneous pixel data, in accordance with the number of errors counted in the transmitted image.

20. An image processing apparatus comprising:

an error corrector for correcting a transmission error of image data transmitted to the image processing apparatus;

a display unit displaying image data;

a refresh control unit which produces a refresh request signal to refresh all the image data displayed on the display unit;

a block image data (in-frame) correction unit which corrects errors in image data in a block designated on the display unit with reference to pixels in peripheral blocks surrounding said block; and a selection circuit which, when a number of error blocks of any image data having been uncorrected by said error corrector coincides with a designated main area and exceeds a predetermined value, selectively connects the image data to an output connected to said refresh control unit to refresh all the image data on the display, and otherwise selectively connects the image data to in-frame correction processing upon completion of receipt of one frame data.

21. An image processing apparatus according to claim 20, wherein said selection circuit, when the error block of any image data having been uncorrected by said error corrector does not coincide with the designated main area, selects said block image data (in-frame) correction unit.

22. An image processing apparatus comprising:
a display unit for displaying image data;
an input device for designating a main block area on a screen of said display unit;
an error corrector for correcting an error caused in image data during transmission to the image processing apparatus;
a refresh control unit which produces a refresh request signal to refresh all the image data displayed on the display unit;
a block image data correction (in-frame) unit which corrects errors in image data in a block designated on the display unit with reference to pixels in peripheral blocks surrounding said block; and
a selection circuit which, when a number of error blocks of image data which have been uncorrected by said error corrector, coincides with said main block area designated on the screen of said display unit and exceeds a predetermined value, selectively connects said error blocks to a first one of two separate outputs connected to a refresh control unit to refresh all the image data on the display, and otherwise selects said error blocks to the other one of said two separate outputs connected to an in-frame correction processing upon completion of receipt of one frame data.

23. An image processing system according to claim 22, wherein said selection circuit, when any error block of image data which has been uncorrected by said error corrector, does not coincide with said main block area designated on the screen of said display unit, selectively connects said block image data to the output connected to said in-frame correction unit.

24. An image processing apparatus comprising:
a display unit for displaying image data;
an error corrector for correcting a transmission error of image data transmitted to the image processing apparatus;
a refresh control unit which produces a refresh request signal to refresh all the image data displayed on the display unit;
a block (in-frame) correction unit which corrects a block subdivided on the display unit with reference to pixels in peripheral blocks surrounding said block; and
a selection circuit which, when an error block having been uncorrected by said error correction coincides with a designated main area and exceeds a predetermined value, selectively connects said error block to an output connected to said refresh control unit to refresh all the image data on the display and otherwise connects said error block to an output connected to an in-frame correction processing upon completion of receipt of one frame data.

25. An image processing apparatus according to claim 24, wherein said selection circuit, when a block uncorrected by said error corrector does not coincide with a designated main area, selectively connects said block to the output connected to said (in-frame) correction unit.

26. An image display method for receiving an image data having a plurality of continuous frames, correcting a transmission error in the image data, and displaying the corrected image data on a display unit, comprising the steps of:
detecting a block of image data which has not been corrected by an error corrector;
determining whether or not said block of uncorrected image data coincides with a designated main area of the display unit;
generating a refresh request signal to refresh all the image data displayed on said display unit when said block of image data coincides with the main area of the display unit, and
selectively connecting said block of image data to one of two separate outputs, one output being connected to an in-frame correction processing employing a clustering reconstruction algorithm and the other output being connected to a refresh request signal transmission processing upon completion of receipt of one frame data, and for providing a correction direction signal to the clustering reconstruction algorithm.

27. An image display method for receiving transmitted image data having a plurality of continuous frames, transmitted from a transmitting station, correcting a transmission error in the image data, and displaying the image data on a display unit, comprising the steps of:
detecting a block of image data which has not been corrected by an error corrector;
determining whether or not said block of uncorrected image data coincides with a main area of the display unit which is identified by data transmitted in combination with the image data from said transmitting station;
producing a refresh request signal to said transmitting station requesting the transmitting station to send again the image data to refresh all the image data on said display unit when said block of image data coincides with the main area of the display unit, and
selectively connecting said block of image data to one of two separate outputs, one output being connected to an in-frame correction processing employing a clustering reconstruction algorithm and the other output being connected to a refresh request signal transmission processing upon completion of receipt of one frame data.

28. An image display method for receiving transmitted image data having a plurality of continuous frames, correcting a distortion in the image data caused by transmission error and displaying the transmitted image data on a display unit, comprising the steps of:
designating a main area of the display on said display unit;
detecting a block of the image data which has not been corrected by an error corrector;
generating a refresh request signal to send the image data for refreshing all the image data for display on said display unit when said block of image data coincides with said main area of the display;
correcting the data in said block of uncorrected image data when said block does not coincide with said main area of the display, and
selectively connecting said block of image data to one of two separate outputs, one output being connected to an in-frame correction processing employing a clustering reconstruction algorithm and the other output being connected to a refresh request signal transmission processing upon completion of receipt of one frame data.

29. An image display method for receiving image data having a plurality of continuous frames transmitted from a transmitting station, correcting a transmission error in the image data, and displaying the image data on a display unit, comprising the steps of:
detecting a block of image data that has not been corrected by an error corrector;

upon determination that said block of uncorrected image data coincides with a designated area, transmitting a refresh request signal to transmit refresh image data to refresh all the image data on said display unit and information for identifying said designated area to said transmitting station;

causing said transmitting station to transmit said image data of said designated area, and selectively connecting said block of image data to one of two separate outputs, one output being connected to an in-frame correction processing employing a clustering reconstruction algorithm and the other output being connected to a refresh request signal transmission processing upon completion of receipt of one frame data.

30. An image processing system comprising:

a transmitting unit for transmitting image data having a plurality of continuous frames;

a receiving unit including a display unit for displaying received image data;

an error corrector for correcting transmission errors in image data caused during transmission of the image data;

a refresh request control unit which generates a refresh request signal for refreshing all of the image data on said display unit;

a block area corrector which corrects image data in a block defined on said display unit with reference to pixels in peripheral blocks surrounding said block; and a select unit which, upon determination that any block area of image data which has been uncorrected by said error corrector coincides with a designated area, selects said refresh control unit to be enabled, and selectively connects said block of image data to one of two separate outputs, one output being connected to an in-frame correction processing and the other output being connected to a refresh request signal transmission processing upon completion of receipt of one frame data.

31. An image processing system according to claim 30, wherein said receiving unit has an input device for designating the designated area on a screen of said display unit; and said select unit, upon determination that a block of image data having been uncorrected by said error corrector coincides with said designated area designated by said input device, selects said refresh control unit to be enabled.

32. An image processing system comprising:

a transmitting unit which transmits image data having a plurality of continuous frames and information which identifies a block of an area to be displayed;

a display unit which displays the transmitted image data;

an error corrector which corrects error data in the image data caused during transmission of the image data;

a refresh control unit which outputs a refresh request signal requesting transmission of a refresh data for refreshing all of the image data on said display unit;

a block error corrector which corrects errors in image data in a block area subdivided on a screen of said display unit with reference to pixels in peripheral block areas surrounding said block area; and a select unit which, upon determination that any block area the error image data in which has been uncorrected by said error corrector coincides with said area having been identified by said information, selects said refresh control unit to be enabled, and selectively connects said block of image data to one of two separate outputs, one output being connected to an in-frame correction processing and the other output being connected to a refresh request signal transmission processing upon completion of receipt of one frame data.

* * * * *